United States Patent [19]
Farrington et al.

[11] 3,976,504
[45] Aug. 24, 1976

[54] SEALED LITHIUM-IODINE CELL

[75] Inventors: Gregory C. Farrington, Elnora; Walter L. Roth, Schenectady, both of N.Y.

[73] Assignee: General Electric Company, Schenectady, N.Y.

[22] Filed: June 23, 1975

[21] Appl. No.: 589,135

Related U.S. Application Data

[63] Continuation-in-part of Ser. No. 517,512, Oct. 24, 1974, abandoned.

[52] U.S. Cl. .............................. 136/83 R; 136/153
[51] Int. Cl.² ......................................... H01M 4/36
[58] Field of Search .................... 136/83 R, 153, 20

[56] References Cited
UNITED STATES PATENTS

| | | | |
|---|---|---|---|
| 3,404,036 | 10/1968 | Kremmer et al. | 136/6 |
| 3,573,105 | 3/1971 | Weininger et al. | 136/86 |
| 3,713,897 | 1/1973 | Liang | 136/153 |
| 3,773,557 | 11/1973 | Mead | 136/6 LF |
| 3,817,790 | 6/1974 | Mitoff | 136/83 |
| 3,817,791 | 6/1974 | Greatbach et al. | 136/83 R |
| 3,849,200 | 11/1974 | Charles et al. | 136/83 R |

OTHER PUBLICATIONS

"Progress in Solid State Chemistry," No. 7, Pergamon Press, 1972, Section 5, pp. 149–151, J. T. Kummer.

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A sealed lithium-iodine cell is described which comprises a casing, an anode positioned within the casing, the anode selected from the class consisting of lithium, lithium as an amalgam, and lithium in a non-aqueous electrolyte, a cathode positioned within the casing, the cathode is selected from the class consisting of iodine, and iodine with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO.9Al_2O_3$ of which 1.3 to 85 percent of the total alkali ion content is lithium.

5 Claims, 5 Drawing Figures

SEALED LITHIUM-IODINE CELL

This application is a continuation-in-part of application Ser. No. 517,512, filed Oct. 24, 1974 now abandoned, under the same title and in the same names.

This invention relates to sealed cells and, more particularly, to such cells employing a lithium anode, an iodine cathode, and a solid lithium-sodium aluminate electrolyte.

Cross-reference is made to copending patent applications Ser. Nos. 517,511 and 517,513, both now abandoned, filed Oct. 24, 1974 in the names of Gregory C. Farrington and Walter L. Roth and entitled "Sealed Lithium-Bromine Cell" and "Sealed Lithium-Chlorine Cell, " respectively, and to copending applications Ser. Nos. 589,137 and 589,136 filed June 23, 1975 in the same names and under the same titles, respectively. Cross-reference is made to copending patent applications Ser. Nos. 557,583 and 557,584 filed Mar. 12, 1975 in the names of Walter L. Roth and Gregory C. Farrington and entitled "Sealed Lithium-Reducible Phosphorous Oxyhalide Cell" and "Sealed Lithium-Reducible Sulfur Oxyhalide Cell, " respectively. Cross-reference is made to copending patent applications Ser. Nos. 559,901 and 559,990 filed Mar. 19, 1975 in the names of Walter L. Roth and Gregory C. Farrington and entitled "Sealed Lithium-Reducible Gas Cell" and "Sealed Lithium-Sulfur Monochloride Cell," respectively. Cross-reference is made to copending patent applications Ser. Nos. 571,500 and 571,556 filed Apr. 25, 1975 in the names of Gregory C. Farrington and Walter L. Roth and entitled "Sealed Lithium-Phosphorous Cell" and "Sealed Lithium-Sulfur Cell, " respectively. Cross-reference is made to copending patent application Ser. No. 572,278 filed Apr. 28, 1975 in the names of Gregory C. Farrington and Walter L. Roth and entitled "Sealed Lithium-Reducible Metal Salt Cell." All of the above copending applications are assigned to the same assignee as the present application.

Sodium-sulfur cells, which operate at elevated temperatures above 300°C, are known in the prior art as, for example, described in Kummer et al. U.S. Pat. No. 3,404,036.

In U.S. Pat. No. 3,849,200 issued Nov. 19, 1974 entitled "Sealed Sodium-Iodine Battery" in the names of Richard J. Charles and Stephan P. Mitoff, there is described and claimed a battery employing a sodium anode, a solid sodium ion-conductive electrolyte, and an iodine cathode.

In U.S. Pat. No. 3,817,790 issued June 18, 1974 entitled "Sealed Primary Iodine Battery" in the name of Stephan P. Mitoff, there is described and claimed a battery employing a sodium anode, a solid sodium ion-conductive electrolyte, and a cathode of solid iodine and iodine contained in a solution of alcohol and sodium iodide. Neither the above copending application nor the above patent teaches a lithium-iodine cell with a lithium-sodium aluminate electrolyte with lithium ion conductivity. Both the above copending patent application and U.S. Pat. No. 3,817,790 are assigned to the same assignee as the present application.

In Greatbatch et al. U.S. Pat. No. 3,817,719 entitled "Lithium Iodine Battery" there is described a battery which employs a lithium anode, and a cathode comprising a charge transfer complex of an organic material and iodine. The iodine within the polymer is in direct contact with the lithium anode. As pointed out in column 4, lines 61–66 of the patent, as soon as the iodine-containing cathode material or depolarizer is placed in the casing in contact with the exposed portion of the lithium plate, a lithium iodide electrolyte begins to form at the interface and an electrical potential difference exists between the anode and the cathode electric leads.

In Mead U.S. Pat. No. 3,773,557 there is described a solid state battery which includes a lithium anode and a mixture of iodine and a non-ionic organic compound. This battery operates in a similar manner to the above-identified Greatbatch et al. patent. There is no initial, specific solid ion-conductive electrolyte between the anode and cathode in either the above Greatbatch et al. or Mead patent.

In Weininger et al. U.S. Pat. No. 3,573,105 there is described a rechargeable non-aqueous alkali metal-halogen electrochemical cell which includes an alkali metal anode, a halogen cathode, a non-aqueous electrolyte, and an ion-permeable barrier to inhibit migration of halogen to the negative electrode between the electrodes. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al. barrier. The electrolyte of the present invention permits cell operation at temperatures above the polymer barrier stability of Weininger et al.

In Liang U.S. Pat. No. 3,713,897 there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. Our electrolyte is not prone to destruction in non-aqueous solvents as opposed to the Liang Patent material.

In "Progress in Solid State Chemistry", No. 7, edited by A. Reiss and J. O. McCaldin, published by Pergamon Press in 1972, there is a Section 5 entitled "$\beta$-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between $\beta$-alumina and various binary nitrate melts containing $NaNO_3$ and another metal nitrate at 300°–350°C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lithium ions in a melt of $LiNO_3$—$LiCl$. Throughout the above Kummer publication there is recognition that the lithium-sodium $\beta$-alumina produced by equilibration of sodium beta-alumina with molten $LiNO_3$ is a unique and stable compound which can readily transport lithium ions without substantially altering its content of sodium ions.

Our present invention is directed to a sealed lithium-iodine cell with positive separation of the anode and cathode by a solid lithium-sodium aluminate electrolyte which is lithium ion conductive.

The primary object of our invention is to provide a lithium-iodine cell which has high cell voltage, high energy density, a near-zero self-discharge rate, and secondary operation capability.

In accordance with one aspect of our invention, a sealed lithium-iodine cell employs a lithium anode, an iodine cathode, and a solid lithium-sodium aluminate electrolyte which is a lithium ion conductor therebetween.

These and various other objects, features and advantages of the invention will be better understood from the following description taken in connection with the accompanying drawing in which.

Figure 1:
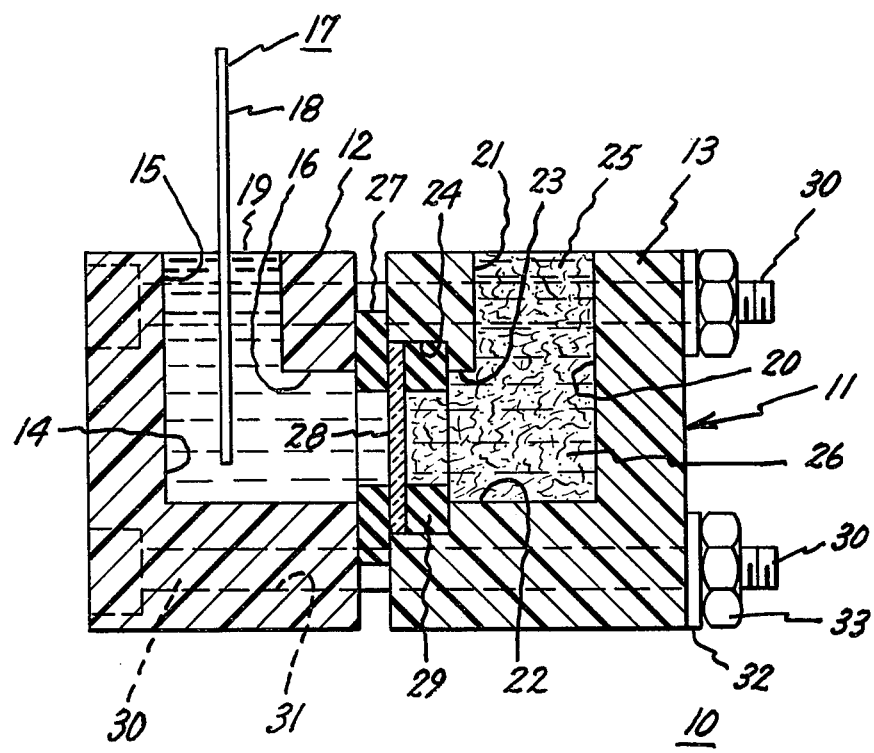
FIG. 1 is a sectional view of a lithium-iodine cell made in accordance with our invention.

In FIG. 1 of the drawing, there is shown generally at 10 a lithium-iodine cell embodying our invention. While we tested this open cell for operability, the cell for general use is sealed. The cell has a two part Teflon polymer casing 11 including an anode portion 12 and a cathode portion 13. Anode portion 12 defines a chamber 14 therein with an upper opening 15. An opening 16 is provided in one side wall. An anode 17 comprises a lithium metal foil 18 in a non-aqueous electrolyte or solvent 19 within chamber 14. Cathode portion 13 defines a chamber 20 therein with an upper opening 21. An opening 22 is provided in one side wall, which opening 22 is shown with a first portion 23 and a recessed portion 24. A cathode 25 comprises iodine dissolved in an ionic conductivity enhancing material of a non-aqueous electrolyte with carbon felt 26 positioned within chamber 20 as a current collector. Appropriate electrical leads (not shown) are connected to anode 17 and cathode 25. Two part casing 11 has its anode portion 12 and cathode portion 13 positioned adjacent to one another and in communication with one another in a leakproof manner by aligning openings 16 and 22 and positioning between the two portions a washer 27, for example, of silicone rubber. A solid lithium-sodium aluminate electrolyte 28 in the form of a disc is positioned against the outer surface of washer 27 and the outer surface of a similar silicone washer 29 fitted within recess 24 of opening 22. The two part casing 11 is held together tightly and in a leak-proof fashion by employing a pair of threaded fasteners 30 which extend through an appropriate opening 31 through both parts of casing 11. A washer 32 and a nut 33 are provided for the threaded end of each fastener to position the structure together. The above assembly results in a lithium-iodine cell which can be employed as a primary cell or as a secondary cell.

Figure 2:
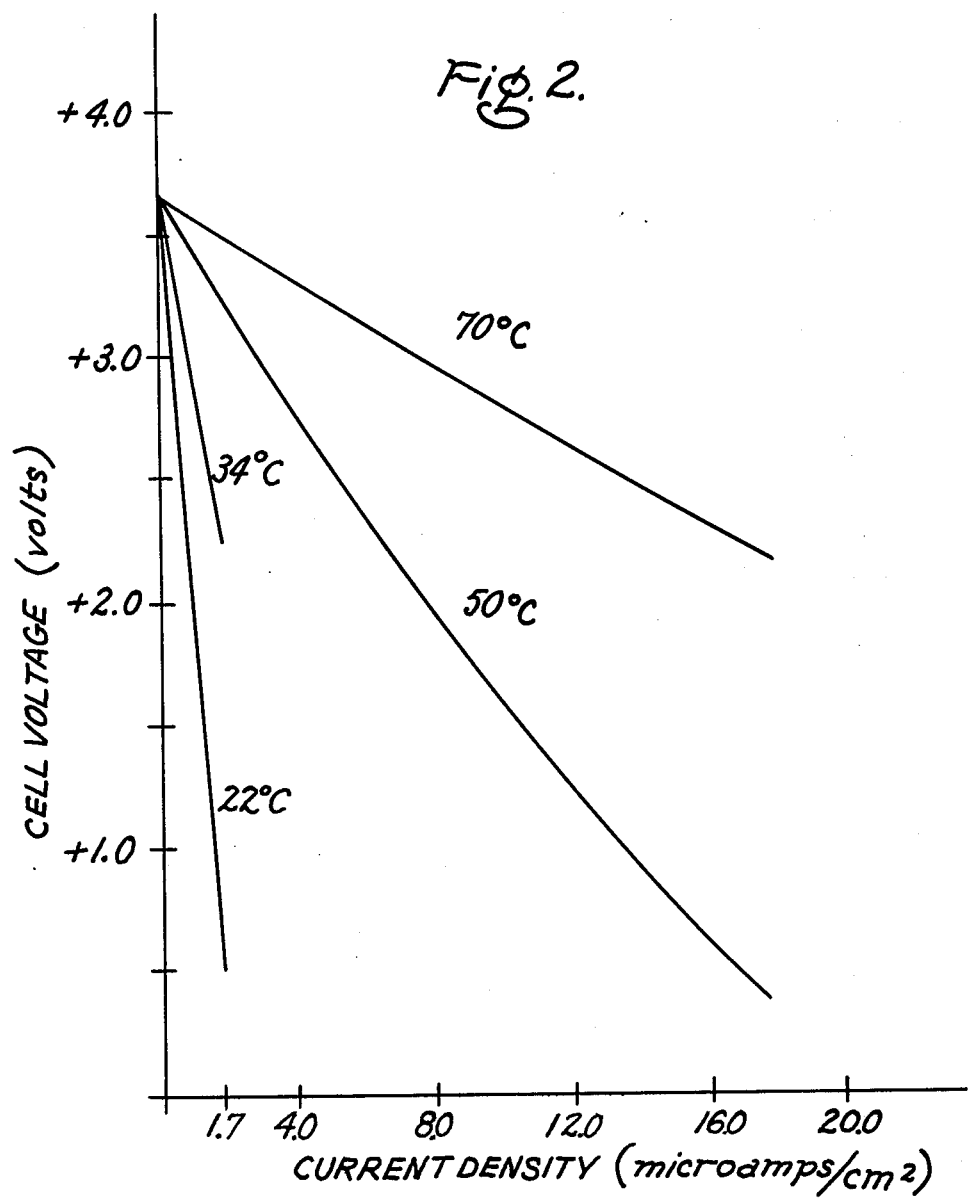
FIG. 2 is a set of polarization curves showing cell performances of the cell shown in FIG. 1 at various temperatures.
Figure 3:
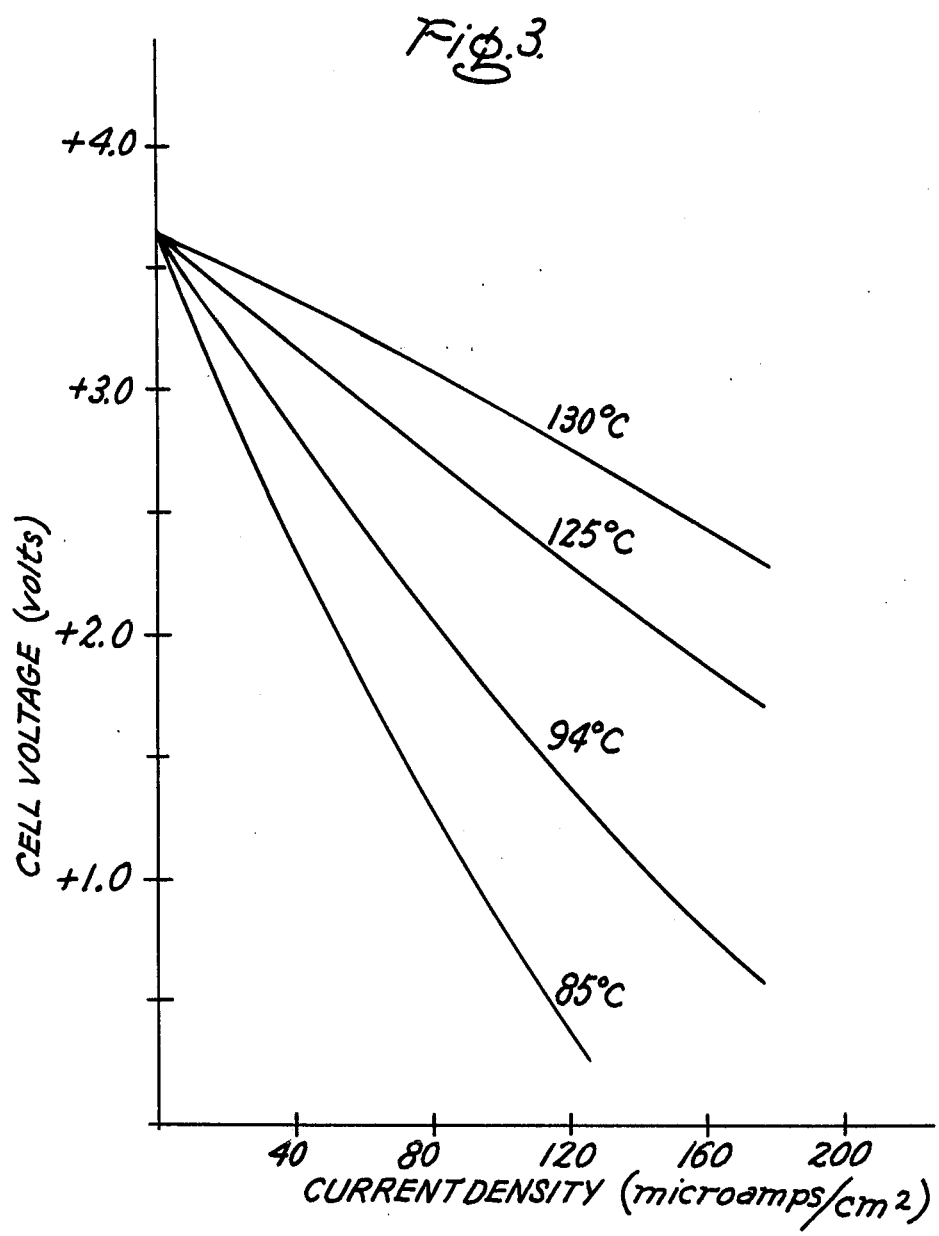
FIG. 3 is a set of polarization curves showing cell performances of the cell shown in FIG. 1 at various temperatures.

In FIGS. 2 and 3, performances of the cell shown in FIG. 1 are provided by polarization curves at various temperatures. In each Figure, cell voltage in volts is plotted against current density in microamperes per square centimeter.

We found that we could form a sealed lithium-iodine cell with a lithium ion-conductive electrolyte by employing a casing having a cathode portion and an anode portion. These two portions are separated by a solid lithium-sodium aluminate electrolyte which will be further described below. Such a casing may be provided in various configurations. For purposes of showing the operability of our cell, we used an anode portion and a cathode portion each of which had top and side openings. Since it was not necessary, the top openings were not sealed during assembly and testing. The casing material chosen was Teflon polymer. A silicone rubber washer was positioned in the recessed opening of the cathode portion and a solid lithium-sodium electrolyte was positioned adjacent the washer within the recessed opening. A silicone rubber washer was positioned between the casing portions. The side openings of the casing portions and the washers were aligned to provide for contact of the cathode with one surface of the solid electrolyte and for contact of the anode with the other surface of the electrolyte. We employed threaded fasteners to hold the casing portions together in a unitary cell structure. It will, of course, be appreciated that various other cell configurations can be employed. In addition to the Teflon polymer casing material various metals and non-metals can be used. Other materials can be substituted for the silicon washers. If desired, in the configuration, the solid electrolyte disc could be sealed by glass seals to the casing to separate the cathode from the anode as shown, for example, in above-mentioned U.S. Pat. No. 3,817,790.

We found further that for the anode we could employ lithium, lithium as an amalgam or lithium in a non-aqueous electrolyte. For the cathode we could employ iodine or iodine with an ionic conductivity enhancing material. We employ a solid lithium-sodium aluminate electrolyte between the cathode and anode to provide a solid barrier preventing contact between the electrodes and to provide lithium ion-conductivity. The solid lithium-sodium ion-conductive electrolyte has an approximate composition of $LiNaO.9Al_2O_3$ of which 40 to 60 percent of the total alkali content is lithium. As it was discussed above in "Progress In Solid State Chemistry," J. T. Kummer, in Section 5 is described a lithium-sodium, $\beta$-alumina material, particularly on pages 149–151. Further, it is described in the article how to manufacture such material. As it will be particularly noted throughout the above Kummer publication, there is no recognition that the lithium-sodium $\beta$-alumina produced by equilibration of sodium beta-alumina with molten $LiNO_3$ is a unique and stable compound which can readily transport lithium ions without altering its content of sodium ions. We use such material containing 50 percent lithium ions as a solid lithium ion conductor electrolyte in our cell as shown in FIG. 1 and described above. The results of performance of this cell are shown in FIGS. 2 and 3. Such material containing 50 percent liithium ions appears to be the optimum amount of lithium ions in the material.

A range of 40 to 60 percent lithium ions in the electrolyte material with the remainder sodium ions provides the desirable conductivity for the operation of our cells. We found unexpectedly that we could obtain the desirable conductivity necessary for the operation of our cells by employing a broader range of 1.3 to 85 percent lithium ions in the electrolyte material with the remainder sodium ions. Tubes made of solid lithium-sodium aluminate electrolyte containing, respectively, 1.34 and 84.7 percent sodium ion substitution by lithium ions were used in later cells of the type shown in FIG. 4, described above, and the results of which are shown in FIG. 5.

We found further that for the cathode we could employ iodine or iodine with various ionic conductivity enhancing materials, such as chemically stable conductive salts or chemically stable non-aqueous electrolytes. Such conductivity salts include lithium iodide and tetraalkylammonium halides. Various non-aqueous electrolytes are suitable. Our preference is propylene carbonate. We added additional chemically stable ionic active salts to the propylene carbonate, for example, lithium perchlorate and tetrabutylammonium fluoroborate to improve the ionic conductivity of the electrolyte. Acetamides provide excellent non-aqueous ionic solvents for iodine. Other suitable non-aqueous electrolytes include butyrolactone, acetonitrile, etc.

Lithium is the lightest practical solid battery anode material and is also the most reducing. The lithium ion is a small and strongly polarizing ion. The salts of the lithium ions are generally more soluble in non-aqueous solvents than their sodium ion counterparts. Such high solubility helps eliminate salt precipitation on the faces of a solid electrolyte and is thus vital for efficient secondary cell operation. Because of the large solubility of lithium iodide in non-aqueous solvents especially in the presence of iodine with which it forms the triiodide, our cell has the capacity of secondary operation.

Figure 4:
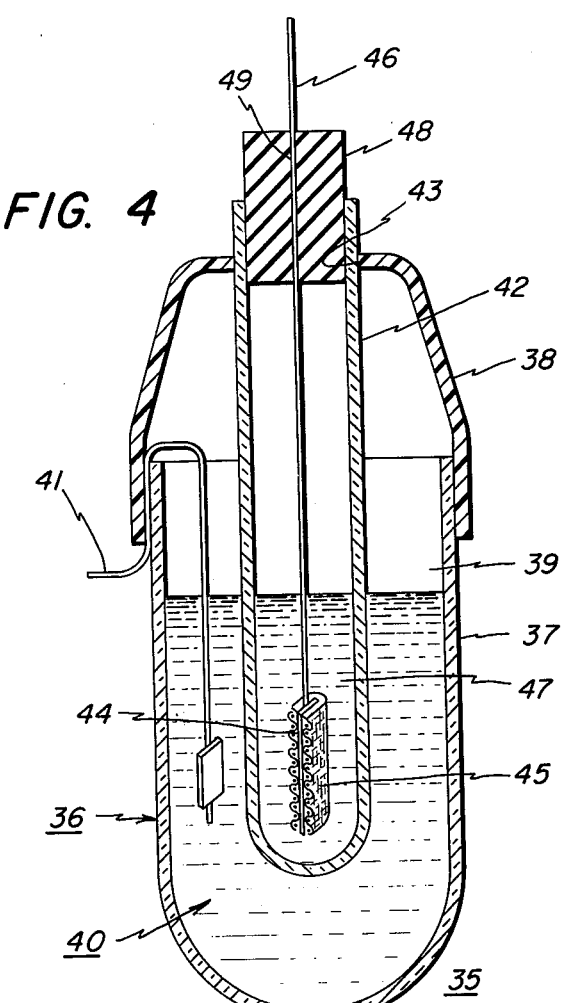
FIG. 4 is a sectional view of a modified lithium-iodine cell made in accordance with our invention.

In FIG. 4 of the drawing there is shown generally at 35 a modified sealed lithium-iodine cell embodying our invention. An outer casing 36 comprises a lower casing portion 37 of glass and an upper casing portion 38 of polyethylene affixed tightly to the upper open end of the lower casing portion 37 thereby providing a chamber 39 for a cathode 40 of a concentrated solution of iodine in a nonaqueous solvent with an ionic conductivity enhancing material and a platinum electrode 41. Electrode 41 extends to the exterior of cell 36 through the junction of the lower and upper casing portions 37 and 38. An inner casing 42 in the form of a tube of solid lithium-sodium aluminate electrolyte is positioned with lower casing portion 37 and immersed partially in cathode 40. An opening 43 is provided in the top of upper casing portion 38 into which tube 42 fits tightly. An anode 44 of lithium metal in the form of a lithium ribbon is pressed onto a nickel mesh 45 which is folded together and attached to the end of a nickel electrical lead 46. An anolyte 47 partially fills tube 42 and is in contact with lithium anode 44. An electrically insulating closure 48 with a hole 49 therethrough is provided at the upper end of tube 42 to seal the initially open end of the tube. Lead 46 extends through hole 49 in closure 48 to the exterior of cell 35.

Figure 5:
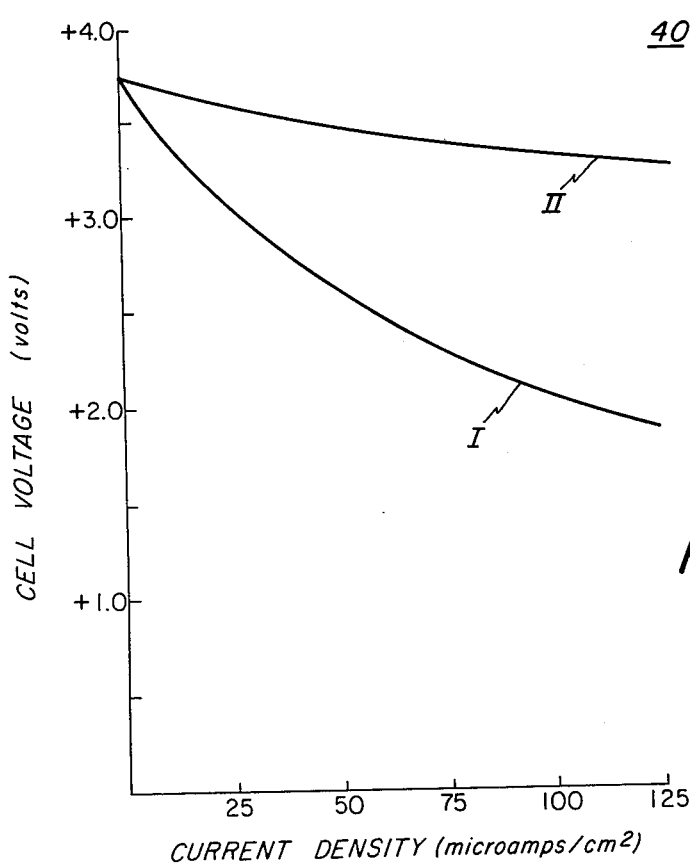
FIG. 5 is a set of polarization curves showing cell performance of the cell shown in FIG. 4.

In FIG. 5, performances of the cell shown in FIG. 4 are provided by polarization curves which were each produced at a temperature of 26°C. In this Figure, cell voltage in volts is plotted against current density in microamperes per square centimeter.

We found further that we could form various modified sealed lithium-iodine cells embodying our invention. One such modified cell employs an outer casing comprising a lower casing portion of glass and an upper casing portion of a plastic such as polyethylene affixed tightly to the upper open end of the lower casing portion thereby providing a chamber for a cathode of a concentrated solution of iodine in a nonaqueous solvent with an ionic conductivity enhancing material. A platinum electrode extends from the cathode to the exterior of the cell through the junction of the lower and upper casing portions. An inner casing in the form of a tube of solid lithium-sodium aluminate electrolyte is positioned within the outer casing and immersed partially in the cathode. An opening is provided in the top of the upper casing portion into which the tube fits tightly. An anode of lithium metal in the form such as lithium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

Examples of lithium-iodine cells, which can be readily sealed, made in accordance with our invention are set forth below:

EXAMPLE I

A cell was assembled as generally described above and shown in FIG. 1 of the drawing. A lithium-sodium aluminate electrolyte disc was made by first preparing a cylinder of $\beta$-alumina by firing $Na_2O+Al_2O_3$ plus 1 percent MgO at 1750°C. The density of the $\beta$-alumina cylinder was 3.224 g/cm$^3$ corresponding to less than 1 percent void volume. A disc of 1 mm in thickness was sliced from the cylinder and converted to a lithium-sodium aluminate electrolyte by immersion in molten $LiNO_3$ at 400°C for 24 hours. The exchange of the sodium ions for the lithium ions was accompanied by a 1.91 percent decrease in weight and the final density was 3.148 g/cm$^3$. X-ray diffraction showed that the electrolyte disc has a hexagonal crystal structure with lattice parameters $a = 5.603 \pm 0.001$ A and $c = 22.648 \pm 0.003$ A.

A two part Teflon polymer casing which included an anode portion and a cathode portion was employed to assemble the cell. Each portion had a chamber with an upper opening and a side opening. The side opening in one portion, the cathode portion, was further recessed. A silicone washer was positioned in the side opening of the cathode portion. The above prepared lithium-sodium aluminate electrolyte disc was positioned against the washer and within the recessed opening in the cathode portion. A silicone washer was positioned between the casing portions and the openings in the washer and in the casing portions were aligned. A pair of threaded fasteners were then employed to hold the casing portions together and tightened at one end by nuts. The chamber of the anode portion was provided with an anode consisting of an electrolyte of propylene carbonate with dissolved lithium perchlorate and tetrabutylammonium fluoroborate. A lithium foil anode was then inserted therein and held in position in the chamber and in contact with the eletrolyte. A similar electrolyte was then placed in the cathode chamber to which one gram of iodine had been added to form the cathode. Additionally, carbon felt was fitted into the chamber within the cathode portion to provide a current collector. This structure resulted in a lithium iodine cell made in accordance with our invention which cell could be readily sealed. The open circuit voltage of the cell was 3.6 volts.

EXAMPLE II

The performance of the cell of Example I is shown in the polarization curves in FIGS. 2 and 3 of the drawing. The cell voltage in volts is plotted against current in microamperes per square centimeter at various temperatures.

No attempts were made to minimize interfacial polarization at the propylene carbonate/lithium-sodium ion-conductive electrolyte interfaces. Observed cell impedance varies from $1.0 \times 10^7$ ohms at 22°C to $2 \times 10^4$ at 130°C. Estimated cell impedance at 22°C based on previously measured lithium-sodium ion-conductive electrolyte material resistivity (5000 ohm-cm at 22°C) was $2 \times 10^3$ ohms. The discrepancy of $10^3 - 10^4$ between estimated and observed impedance is attributable to the above discussed interfacial polarization. EXAMPLES III–IV Two cells Nos. 2 and 3, which are Examples III and IV, were assembled as generally described above and as shown in FIG. 4 of the drawing. Each of the cells was constructed in the same manner with the exception that cell No. 2 had a lithium-sodium aluminate tube with a 84.7 percent lithium ion content while cell No. 3 had a lithium-sodium aluminate tube with a 1.34 percent lithium ion content. The remaining alkali ion content of each tube was sodium ions.

The tube for cell No. 2 was formed from a tube of sodium $\beta$-alumina approximately 6.2 cm. long, 1.1 cm. OD, and 0.15 cm. wall thickness. The tube was baked out overnight at 1175°C prior to lithium ion exchange. The lithium ion exchange was made by immersion in lithium nitrate at 600°C for 13 hours. A resulting 3.12 percent weight decrease corresponded to 84.7 percent sodium substitution by lithium ions.

The tube for cell No. 3 was formed from an identical sodium $\beta$-alumina tube which was baked out in the same manner. The lithium ion exchange was made by immersion in 20 mole percent lithium nitrate and 80 mole percent sodium nitrate at 400°C for 72 hours. A resulting 0.049 percent weight decrease corresponded to 1.34 percent sodium substitution by lithium ions.

For each cell, an outer casing was formed of a lower casing portion of glass and an upper casing portion of polyethylene affixed tightly to the upper open end of the lower casing portion thereby providing a chamber for each cathode which consisted of a concentrated solution of iodine in a nonaqueous solvent of propylene carbonate containing lithium perchlorate with 0.1M tetrabutylammonium fluoroborate and saturated with $LiClO_4$. A platinum electrode was immersed in the cathode and extended to the exterior of the cell through the junction of the lower and upper casing portions. An inner casing in the form of a tube of solid lithium-sodium aluminate electrolyte was positioned within each outer casing and immersed partially in the cathode. The tube for cell No. 2 contained 84.7 percent lithium ion content while the tube for cell No. 3 contained 1.34 percent lithium ion content. An opening was provided in the top of each upper casing portion into which the respective tube fitted tightly. An anode of lithium metal in the form of a lithium metal ribbon pressed onto a nickel mesh was folded together and attached to the end of a nickel electrical lead. An anolyte of 0.1M tetrabutylammonium tetrafluoroborate in propylene carbonate saturated with $LiClO_4$ partially filled the tube and was in contact with the lithium anode. An electrically insulating closure with a hole therethrough was provided at the upper end of each tube to seal the initially open end of the tube. The lead extended through the hole in the closure to the exterior of the cell.

The polarization curves for cells Nos. 2 and 3, which are shown in FIG. 5 of the drawing, were produced at a temperature of 26°C. The cell voltage in volts is plotted against current in microamperes per square centimeter for each cell. The curve for cell No. 2 is identified as curve I and the curve for cell No. 3 is identified as curve II in FIG. 5 of the drawing. No attempts were made to minimize interfacial polarization at the lithium-sodium aluminate ion-conductive electrolyte interfaces.

While other modifications of the invention and variations thereof which may be employed within the scope of the invention have not been described, the invention is intended to include such as may be embraced within the following claims:

What we claim as new and desire to secure by Letters Patent of the United States is:

1. A sealed lithium-iodine cell comprises a casing, an anode positioned within the casing, the anode selected from the class consisting of lithium, lithium as an amalgam and lithium in a nonaqueous electrolyte, a cathode positioned within the casing, the cathode selected from the class consisting of iodine, and iodine with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO.9Al_2O_3$ of which 1.3 to 85.0 percent of the total alkali ion content is lithium.

2. A sealed lithium-iodine cell as in claim 1, in which 40 to 60 percent of the total alkali ion content is lithium.

3. A sealed lithium-iodine cell as in claim 1, in which 50 percent of the total alkali ion content of the solid lithium-sodium aluminate electrolyte composition is lithium.

4. A sealed lithium-iodine cell as in claim 1, in which the cathode and the anode each include a non-aqueous electrolyte of propylene carbonate with dissolved lithium perchlorate and tetrabutylammonium fluoroborate.

5. A sealed lithium-iodine cell as in claim 1, in which the cathode includes ionic active salts of lithium iodide and a tetraalkylammonium halide.

* * * * *